United States Patent [19]
Zamboni

[11] 4,084,763
[45] Apr. 18, 1978

[54] MACHINE FOR HANDLING ARTIFICIAL TURF OR THE LIKE

[75] Inventor: Frank J. Zamboni, Paramount, Calif.

[73] Assignee: Frank J. Zamboni & Co., Paramount, Calif.

[21] Appl. No.: 673,449

[22] Filed: Apr. 5, 1976

[51] Int. Cl.² .......................................... B65H 17/46
[52] U.S. Cl. .............................. 242/86.52; 214/147 G
[58] Field of Search ............ 242/86.52, 86.5 R, 86.7, 242/67.1 R; 219/147 G, 147 R; 254/175.5

[56] References Cited
U.S. PATENT DOCUMENTS 3,481,556  12/1969  McDonnell ..................... 242/86.52
3,632,054  1/1972   Heppelmann .................... 242/86.52
3,687,392  8/1972   Parry ............................ 242/86.5 R
3,880,305  4/1975   Van Polen ...................... 242/147 G
3,968,940  7/1976   Godbersen ...................... 242/86.5 R Primary Examiner—Edward J. McCarthy
Attorney, Agent, or Firm—Herbert E. Kidder

[57] ABSTRACT

A machine for laying down and taking up strips of artificial turf comprising a self-powered, highly maneuverable carrier having means for transporting, picking up and winding or unwinding a roll of turf strip. Means are provided to shift the roll axially relative to the carrier to precisely lay down each strip in side-by-side relation with a previously laid strip.

15 Claims, 8 Drawing Figures

U.S. Patent  April 18, 1978  Sheet 1 of 4  4,084,763
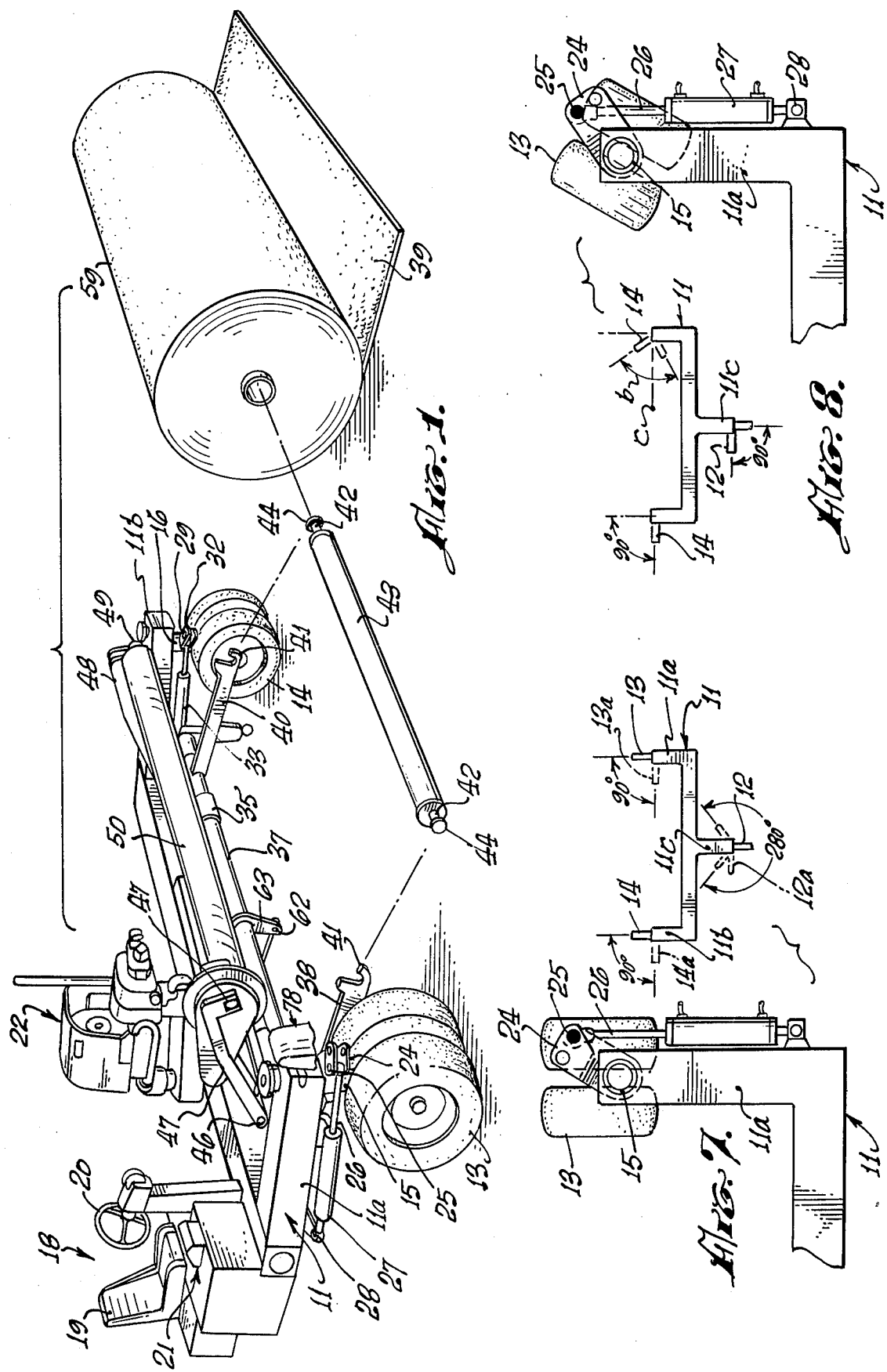

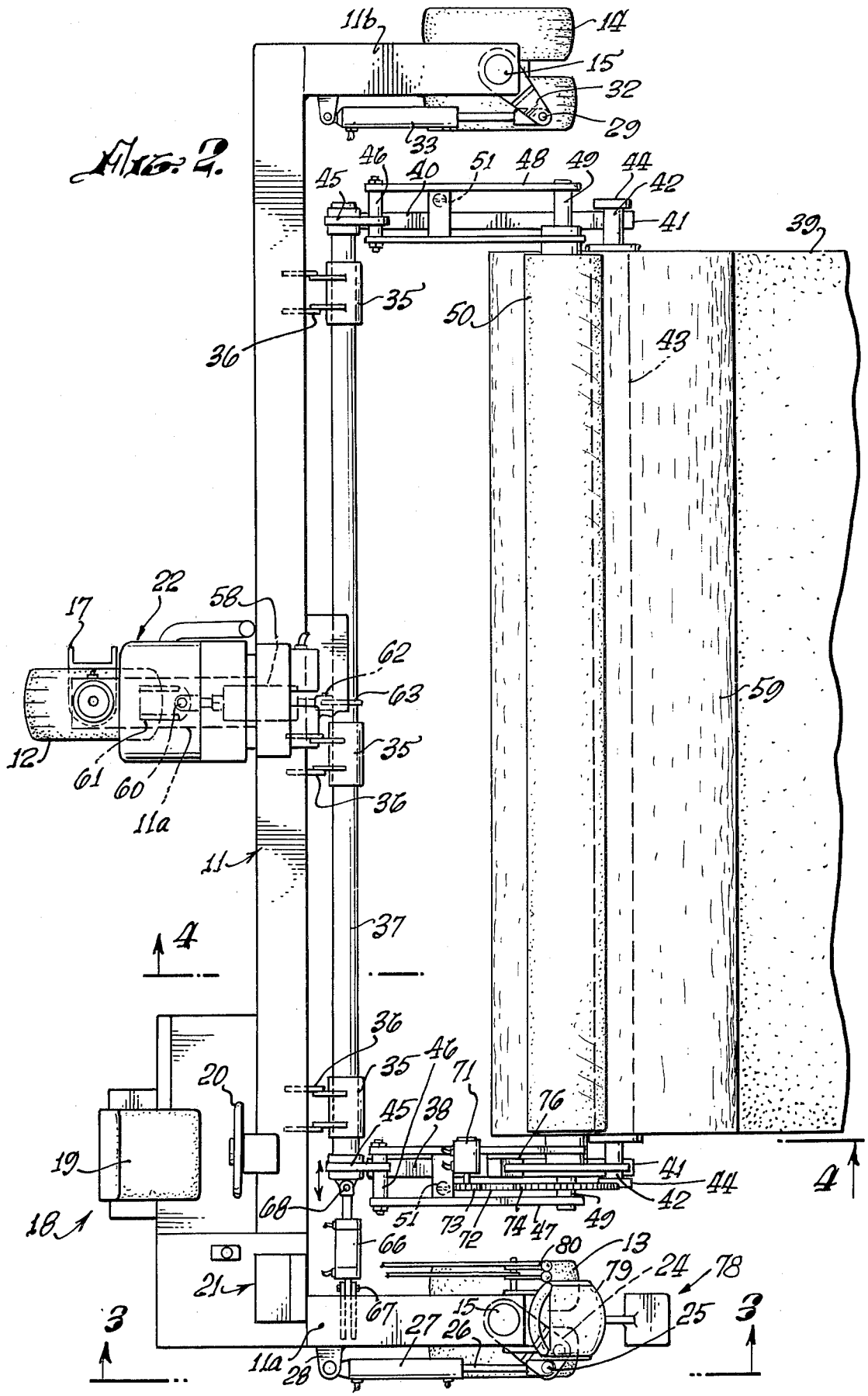

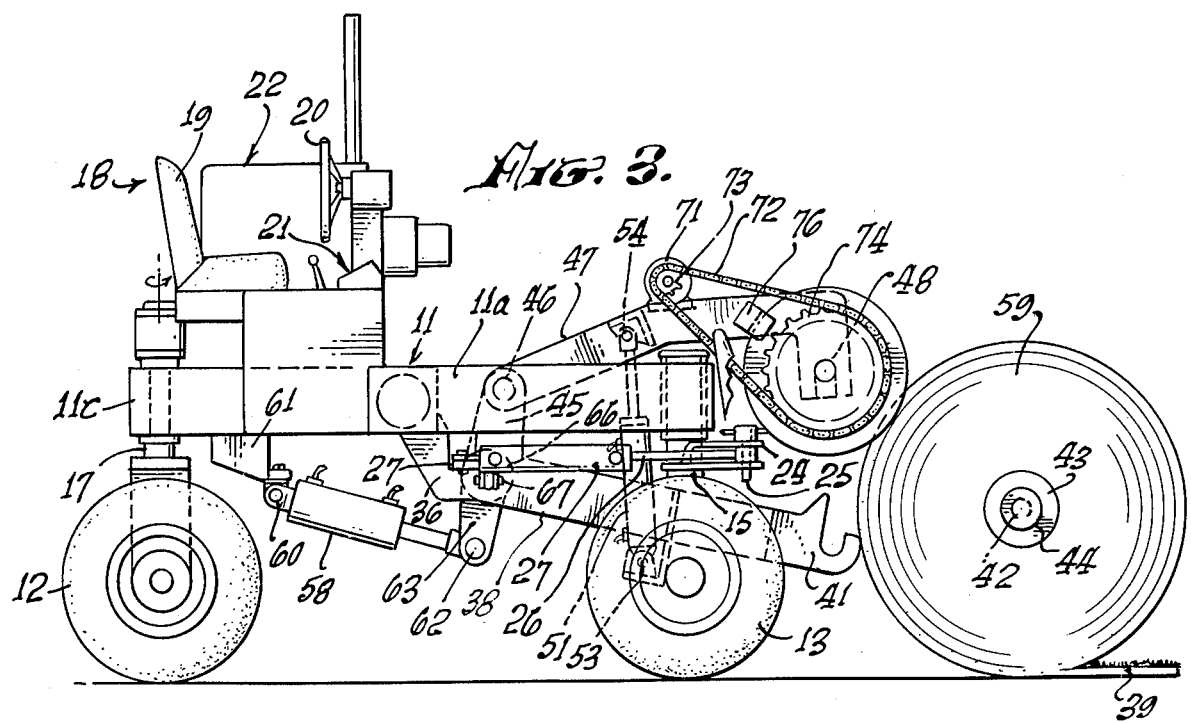
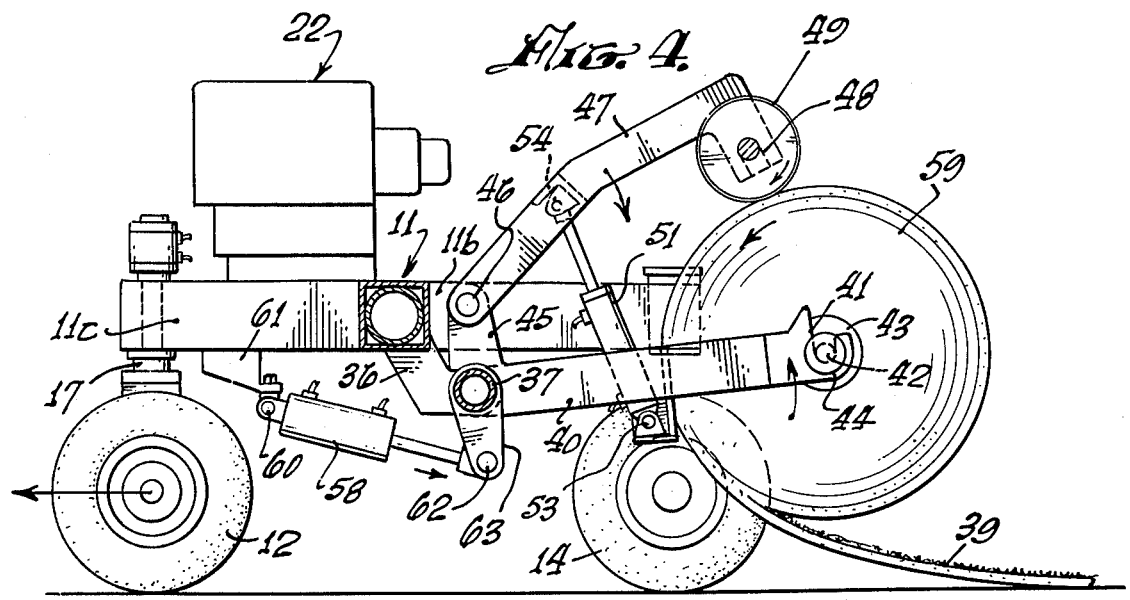

MACHINE FOR HANDLING ARTIFICIAL TURF OR THE LIKE

BACKGROUND OF THE INVENTION

1. Field of the Invention

This invention relates to a machine for laying or removing strips of artificial turf or the like.

2. Description of the Prior Art

Artificial turf is used in stadiums and on playing fields as a surface cover for certain athletic events, such as football and baseball games. The turf is generally manufactured in relatively large strips, typically on the order of 15 feet wide and 200 feet long, and weighing from 3,500 to 4,000 lbs. When rolled, it forms a roll approximately 5 feet in diameter and 15 feet long. Thus, each strip, in either rolled form or when layed out, is relatively unwieldy and cumbersome to handle and/or to store. Further, each strip must be laid in exact abutting relation with adjacent strips to eliminate cracks or openings therebetween and to prevent overlapping of one strip on another.

As an indication of the accuracy with which such strips must be laid down it should be noted that a majority of installations each strip must be zipped to adjoining strips with zipper connectors.

In many cases, particularly in indoor stadiums or on indoor playing fields, certain events call for the use of artificial turf, and other events, such as dancing, exhibitions or skatng, call for a solid firm floor, thus necessitating frequent laying and removal as well as storing of the many strips required to cover the usual playing field.

Heretofore, machines have been developed for laying and removing strips of artificial turf. Generally, such machines comprise a wheeled trailer pulled by a tractor. The trailer carries a mandrel from which a strip of turf is unwound during the laying process. Drive means are provided to rotate the mandrel to wind the strip thereon when removng the latter from the field.

Although such machines are generally satisfactory, they have certain drawbacks which detract from efficient operation. For example, they require auxiliary apparatus for hoisting a full roll of artificial turf into position thereon or for removing such roll and then transporting the same to a suitable storing location. Also, since such prior machines are generally drawn by a tractor, it is difficult to accurately maneuver the same to properly lay one strip in exact abutting engagement with an adjacent previously laid strip and this operation usually requires the combined efforts of two or more operators. Further, such machines require openings or gateways in excess of 15 feet in width in order for them to pass through and this may preclude their use in certain stadiums or playing fields having relatively narrow gateways.

SUMMARY OF THE INVENTION

A principal object of the present invention is to provide a machine for quickly and readily laying or removing strips of artificial turf.

Another object is to provide a highly maneuverable machine for precisely laying strips of artificial turf in side-by-side relation.

Another object is to reduce the number of operators required to operate a turf handling machine of the above type.

Another object is to provide a machine for laying, removing and storing strips of artificial turf without requiring the use of auxiliary apparatus.

Another object is to provide a machine for laying strips of artificial turf under a desired tension.

A further object is to provide an apparatus of the above type which is self-propelled and provided with common drive means for both propelling and operating the same under control of a single operator.

A further object is to provide an apparatus of the above type which may pass through a gateway or opening of minimum width.

According to the basic aspects of the present invention, a self-propelled artificial turf handling machine is provided having spaced bearing supports for the opposite ends of a mandrel upon which a strip of artificial turf is to be wound or unwound. Motor means are provided to raise or lower the supports to pick up a roll of turf and to transport the same when laying or removing the turf or storing the same. Such supports are also adjustable to maintain the roll at a desired height above the ground during the transporting, laying or removing process. A power driven drive roll is provided to frictionally engage the periphery of the roll of turf for the purpose of winding the same thereon. Since the drive roll engages the periphery of the turf roll, it will be effective to drive the same at a constant surface speed and at a constant torque regardless of the varying diameter of the roll, as the turf is accumulated on the mandrel.

According to another aspect of the invention, the roll of turf supported by the mandrel may be adjusted laterally relative to the machine proper so that it may be laid down precisely in side-by-side relation with a previously laid strip. Additionally, the machine is of a narrow width and may be steered to move endwise through gateways or other openings of minimum width even when transporting a roll of turf. Further, the machine is capable of transporting a roll of turf to and from any desired storage location, such as against other rolls or against a wall or building without having to additionally handle the roll or to require the use of auxiliary equipment for this purpose.

BRIEF DESCRIPTION OF THE DRAWINGS

The manner in which the above and other objects of the invention are accomplished will be readily understood on reference to the following specification when read in conjunction with the accompanying drawings, wherein:

FIG. 1 is a perspective view of a turf handling machine embodying a preferred form of the present invention.

FIG. 2 is a plan view of a machine.

FIG. 3 is a side elevation of the machine illustrating the turf roll support arms in lowered position and the drive roll is raised position.

FIG. 4 is a sectional view taken along line 4—4 of FIG. 2 illustrating a turf roll supported by the machine.

FIG. 7 is a fragmentary plan view and schematic view of part of the machine illustrating one steering arrangement.

FIG. 8 is a view similar to FIG. 7 but illustrating another steering arrangement.

DESCRIPTION OF THE PREFERRED EMBODIMENT

Figure 5:
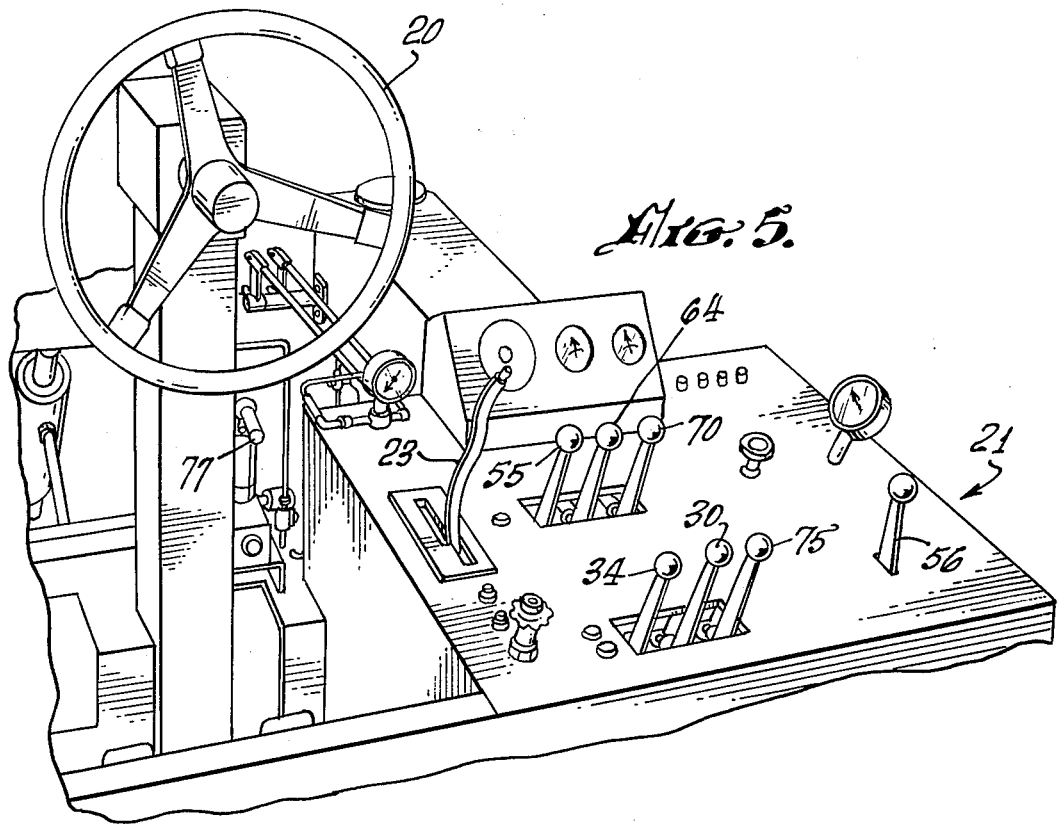
FIG. 5 is a perspective view of the machine control panel.
Figure 6:
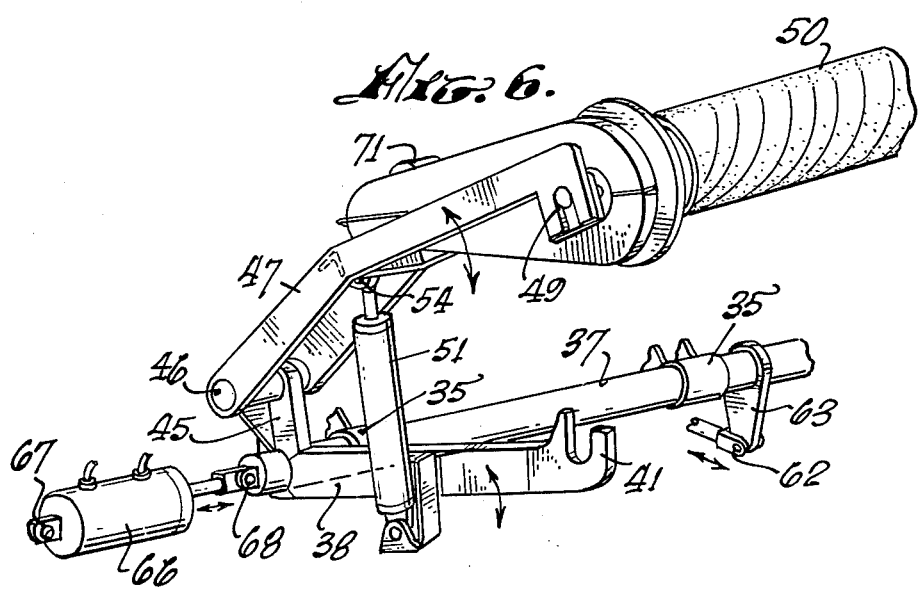
FIG. 6 is a perspective view, with parts broken away, illustrating the raising and lowering means for the drive roll.

Referring to the drawings, the machine or carrier comprises a U-shaped frame 11 supported for movement over the ground by a steerable rear wheel 12 and two sets of steerable forward wheels 13 and 14. The latter support steerable trucks 15 and 16 mounted in bearings carried by the outer arms 11a and 11b of frame 11 for pivotal movement about vertical axes. The rear wheel 12 is located midway between the ends of frame 11 and supports a steerable truck 17 which likewise is mounted in a bearing carried by a rearward extension 11c of the frame 11 for pivotal movement about a vertical axis.

An operator's station generally indicated at 18 is provided on the frame 11 just to the rear of frame arm 11a and comprises a seat 19, a steering wheel 20 and a control panel generally indicated at 21 (FIG. 5).

An internal combustion engine 22 is mounted on frame extension 11c and is operable to drive the various movable elements of the machine through suitable hydraulic drive transmissions (not shown). One such transmission is provided under control of the steering wheel 20 to steer the rear wheel 12.

Another transmission is effective to drive the rear wheel 12 under control of a valve control lever 23 located on the control panel 21. The latter is manipulatable by the operator fore and aft of its illustrated neutral position to cause the rear wheel 12 to drive the machine forwardly or rearwardly. When the lever is in its neutral position the machine is immoble.

Other hydraulic drive transmissions operable by the engine 22 are provided to steer the wheels 13 and 14 independently of each other and of the rear wheel 12. For this purpose, the truck 15 of wheels 13 is provided with an arm 24 (see also FIG. 7) having a bearing connected by a pivot pin 25 to the piston 26 of a double acting hydraulic cylinder 27 which is pivoted at 28 to the frame 11. Energization of the cylinder 27 is controlled by a valve control level 30 on panel 21. Movement of lever 30 by the operator will cause actuation of the cylinder 27 to steer the wheels 13 from their full line positions illustrated in FIGS. 2 and 7 through an angle $a$ of 90° to their dotted line position 13a or to any desired intermediate angular position therebetween. Likewise, the truck 16 of the wheels 14 is provided with a similar arm 32 connected by a pivot pin 29 to the piston 50 of a hydraulic cylinder 33. Such cylinder is controlled by a valve control lever 34 on panel 21 to likewise steer the wheels 14 from their full line position of FIGS. 2 and 7 through an angle of 90° to their dotted line positions 14a or to any position therebetween.

Bearing sleeves 35 are spaced along the frame 11 and are supported therefrom by brackets 36. A torque tube 37 is rockably and slideably supported by the bearing sleeves 35 and carry turf roll support arms 38 and 40 attached thereto on opposite ends thereof. Each of the arms 38 and 40 has an upwardly extending bearing jaw 41 formed in the forward end thereof to receive and rotatably support trunnion journals 42 at the opposite ends of a mandrel 43 on which a turf strip indicated at 39 is wound or unwound. Flanges 44 are provided at the outer ends of the trunnions 42 to prevent lateral shifting of the mandrel 43 relative to the arms 38 and 40 when mounted in the bearing jaws 41.

Arms 38 and 40 have upstanding arm sections 45 which are pivoted at 46 to drive roll support arms 47 and 48. The latter have bearings which rotatably support trunnion journals, i.e. 49, formed on opposite ends of a drive roller 50 having an outer friction surface for drivingly engaging a roll 59 of turf carried by the mandrel 43, as will be described later.

Two way operating hydraulic cylinders 51 are provided for raising and lowering the drive roller 50 relative to the turf roll 59. For this purpose, each cylinder 51 is pivotally connected at 53 to a respective arm 38, 40 and its piston is pivotally connected at 54 to a respective arm 47, 48. Said cylinders are driven in unison by the engine 22 through a suitable hyraulic transmission under control of a valve control lever 55 located on the control panel 21. Movement of the lever 55 in one direction from its illustrated neutral position will cause cylinders 51 to raise the arms 47 and 48 and movement of the lever in the opposite direction will cause cylinders to lower the arms.

A constant pressure system (not shown) is preferbly incorporated in the transmission drive for the cylinders 51 and is under control of a valve control lever 56 to cause a constant downward pressure to be applied by the cylinders 51 to hold the drive roll 50 against the turf roll 59 so that such pressure may remain constant as the diameter of the turf roll 59 changes during a rolling or unrolling process.

Means are provided to raise and lower the turf roll support arms 38 and 40 in unison. For this purpose, a hydraulic cylinder 58 is pivotally connected at 60 to a bracket 61 on the frame part 11c, and its piston is pivotally connected at 62 to a bracket 63 secured to the torque tube 37. Cylinder 58 is driven by the engine 22 through a suitable hydraulic drive transmission under control of a valve control lever 64 located on panel 21 and adjustable by the operator. It will be noted that raising and lowering of the arms 38 and 40 will, through cylinders 51, correspondingly raise and lower the drive roll support arms 47 and 48.

Means are provided to shift the torque tube 37 axially within bearing sleeves 35 for the purpose of laterally adjusting the turf roll 59 and turf strip 39 relative to the machine during the rolling or unrolling process. For this purpose, a double acting hydraulic cylinder 66 is connected at 67 to a part of the frame 11 and its piston is connected to the torque tube at 68. Such cylinder is driven by the engine 22 through a suitable hydraulic drive transmission under control of a valve control lever 70 on the control panel 21 and adjustable by the operator. Movement of the control lever 70 in one direction beyond its neutral illustrated position will cause cylinder 66 to shift the tube 37 and turf roll 59 in a first direction and movement of lever 70 in an opposite dirction will cause cylinder 66 to shift the tube and turf roll in a second opposite direction.

The drive roll 50 is driven by the engine 22 through a suitable hydraulic drive transmission and for this purpose, a hydraulic motor 71 is mounted on the drive roll support arm 47 and drives the roller 50 through a chain 72 wrapped over a drive sprocket 73 on the motor and a driven sprocket 74 attached to the roller 50. Motor 71 may be controlled by the operator by means of a valve control lever 75 on the control panel, such lever controlling the hydraulic transmission for the motor 71.

An adjustable friction brake 76 is provided to apply a drag of a desired amount against the roller 50 during unrolling of the turf roll 59 in order to apply a desired tension to the turf strip as it is being laid. Such brake is adjustable by a hydraulic transmission under control of a control lever 77 located at the operator's station 18.

Describing now the operation and manipulation of the machine and assuming that a roll of turf is to be picked up, transported and then laid, the operator by manipulation of the steering wheel 20 to steer rear wheel 12 and, if desired, by additional adjustment of one or both of the control levers 30 and 34 to likewise steer wheels 13 and 14, moves the machine into a position directly adjacent the turf roll. That is, he may merely steer the rear wheel 12 by means of steering wheel 20 or he may also steer one or both of the wheels 13 and 14, particularly when maneuvering the machine through a turn of short radius or around obstructions. Alternatively, the operator may "crab" the machine by steering all three wheels in parallel directions at different angles relative to the length of the frame 11. On the other hand, particularly if the apparatus must be maneuvered through a relatively narrow gateway or doorway, the operator may turn all three wheels into their dotted line positions 12a, 13a and 14a (FIG. 7) to cause the machine to move sideways in the direction of its longest dimension. Here also, steering may be performed by use of the rear wheel 12 only, although the wheels 13 and 14 may also be steered if desired to properly maneuver the machine.

It should be noted that wheels 13 may be relocated to steer through an angle b of 90° (see FIG. 8) arranged 45° on opposite sides of a line c extendng parallel to the length of the frame 11. For this purpose, the wheels 13 are located to insert the pivot pin 25 in a second brearing 69 located in the arm 24.

Upon reaching the turf roll 59 with the mandrel 43 therein, the operator raises the roll support arms 38 and 40 by manipulating control lever 64, causing the bearing jaws 41 to pick up the mandrel 43 and thus raise the turf roll 59 into carrying position as seen in FIG. 4. At this time the drive roll 50 is preferably lowered to engage and hold the turf roll.

When the turf roll 59 is transported to the place where it is to be laid, the operator manipulates the control lever 70 to laterally shift the turf roll until it is precisely aligned with an adjoining previously laid turf strip. The leading edge of the turf strip 39 is then suitably secured to the ground surface and the control lever 55 may be manipulated to create the proper frictional engagement between the drive roller 50 and the turf roll. The brake 76 is then adjusted for an appropriate amount of drag by manipulation of the brake control lever 77 and the apparatus is driven rearwardly, thereby laying the strip under tension. During such laying operation, the operator manipulates the lateral control lever 70 to maintain precise lateral alignment of the strip as it is being laid down. Also, he may control the arms 38 and 40 to maintain the turf roll at a desired height above the ground by proper manipulation of control lever 64. It should be noted that during any adjustment of the arms 38 and 40, the drive roller 50 will automatically follow to maintain a driving engagement with the turf strip.

In rolling up the strip of turf, the leading edge of the strip is suitably attached to the mandrel 43 and, after forming one or more turns of the strip around the mandrel, the control lever 55 is manipulated to lower the drive roll 50 into frictional engagement with such newly formed turf roll. The drive roll motor 71 is then energized, causing the drive roll 50 to roll up the turf roll, i.e. 59. Preferably, this motion is also used to pull the machine forwardly and thus apply a tension to the rolled turf strip.

Although a single operator seated at station 18 can normally control the machine through the aforementioned controls, a second control station generally indicated at 78 is located on the frame arm 11a and includes a seat 79 and controls 80 which duplicate certain of the controls at station 18. Thus, for example, a second operator at station 78 may control the lateral adjustment of the turf roll and turf strip during the laying operation by manipulation of a control for cylinder 66, while the operator at station 18 tends to all other controls.

It will be obvious to those skilled in the art that many variations can be made in the exact structure shown without departing from the spirit of this invention.

I claim:

1. Apparatus for handling a strip of artificial turf or the like comprising
   a wheeled carrier,
   means for driving said carrier over the ground,
   spaced support members on said carrier for supporting the opposite ends of a mandrel on which a roll of said strip is to be wound or unwound,
   means for raising or lowering said support members relative to said carrier whereby to raise or lower said roll,
   a roller carried by said carrier for frictionally engaging the periphery of said roll, and
   drive means on said carrier for rotating said roller whereby to wind said strip.

2. Apparatus as defined in claim 1 comprising means on said carrier for moving said support members in a direction parallel to the axis of said mandrel and relative to said carrier.

3. Apparatus as defined in claim 1 comprising means on said carrier for moving said roller into and out of driving engagement with said roll.

4. Apparatus as defined in claim 3 wherein said roller moving means comprising yieldable means for maintaining said roller in driving engagement with said roll as said roll increases in diameter.

5. Apparatus as defined in claim 3 wherein said moving means comprises actuating means carried by said support members.

6. Apparatus as defined in claim 1 comprising a brake for selectively braking said roller.

7. Apparatus as defined in claim 1 wherein
   said carrier is U-shaped including a base section and spaced arm sections,
   said support members extending between said arm sections whereby to support said mandrel between said arm sections,
   steerable wheels supporting respective ones of said arm sections, and
   at least one steerable wheel supporting said base section.

8. Apparatus as defined in claim 7 wherein said wheels are steerable in directions parallel to the axis of said mandrel and in directions at right angles to said axis.

9. Appartus as defined in claim 1 comprising means operable by said drive means for selectively operating said raising and lowering means.

10. Apparatus as defined in claim 2 comprising means operable by said driving means for selectively operating said support member moving means.

11. Apparatus for handling a strip of artificial turf or the like comprising

U-shaped carrier including a base section and spaced arm sections, steerable wheels for supporting said carrier, drive means on said carrier for driving certain of said wheels, spaced support members on said carrier for supporting the opposite ends of a mandrel between said arm sections, said mandrel being effective to support a roll of said strip, means selectivey operable by said drive means for raising and lowering said support members, a roller carried by said carrier for frictionally engaging said roll, and means selectively operable by said drive means for rotating said roller.

12. Apparatus as defined in claim 11 comprising steering means selectively operable by said drive means for steering said wheels.

13. Apparatus as defined in claim 12 comprising means for controlling said steering means to steer said wheels independently of each other.

14. Apparatus for handling a strip of artificial turf comprising a U-shaped carrier including a base section an spaced arm sections, wheels supporting said carrier, bearing means on said carrier, a shaft rockably and slideably supported by said bearing means, first spaced support arms on said shaft and extending between said arm sections, means on said support arms for supporting the opposite ends of a mandrel on which said strip is to be wound or unwound, a friction roller carried by said carrier for drivingly engaging the periphery of a roll of said strip on said mandrel, means for driving said roller, means for selectively rocking said shaft and said support arms whereby to raise and lower said mandrel, and means for selectively sliding said shaft along said bearing means whereby to shift said mandrel endwise between said arm sections.

15. Apparatus as defined in claim 14 comprising roller supporting arms pivotally supported by said first arms for supporting said friction roller, and means on said first support arms for raising and lowering said roller supporting arms whereby to engage and disengage said roller with said roll.

* * * * *